United States Patent
Woods

(10) Patent No.: US 9,707,596 B2
(45) Date of Patent: *Jul. 18, 2017

(54) SURFACE-CLEANING DEVICE

(71) Applicant: Grillbot, LLC, New York, NY (US)

(72) Inventor: Ethan Woods, New York, NY (US)

(73) Assignee: Grillbot, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/231,120

(22) Filed: Aug. 8, 2016

(65) Prior Publication Data

US 2016/0368027 A1 Dec. 22, 2016

Related U.S. Application Data

(60) Continuation-in-part of application No. 14/884,675, filed on Oct. 15, 2015, now Pat. No. 9,408,458, which
(Continued)

(51) Int. Cl.
*A46B 3/18* (2006.01)
*A46B 7/04* (2006.01)
(Continued)

(52) U.S. Cl.
CPC .............. *B08B 1/002* (2013.01); *A46B 3/18* (2013.01); *A46B 7/04* (2013.01); *A46B 9/02* (2013.01);
(Continued)

(58) Field of Classification Search
CPC ....... A46B 13/00; A46B 13/001; A46B 13/02; A46B 13/026; A46B 2200/3033;
(Continued)

(56) References Cited

U.S. PATENT DOCUMENTS 5,432,970 A 7/1995 Reid
6,338,013 B1 1/2002 Ruffner
(Continued)

FOREIGN PATENT DOCUMENTS

AU 2012346168 A1 11/2016
CN 101301186 A 11/2008
(Continued)

OTHER PUBLICATIONS

International Search Report and Written Opinion for PCT Appliation No. PCT/US2012/066678 issued Jul. 18, 2013 which claims to the same priority as the instant application; 5 pgs. KR10-2009-0042785 (filed May 15, 2009) on the ISR is the application number of publication No. KR10-2010-0123585 published on Nov. 24, 2010.
(Continued)

*Primary Examiner* — Monica Carter
*Assistant Examiner* — Stephanie Berry
(74) *Attorney, Agent, or Firm* — Harness, Dickey & Pierce, P.L.C.

(57) ABSTRACT

A device for cleaning a surface (e.g., a barbeque grill, etc.) generally includes an enclosure having at least a lower side, an upper side, and a peripheral edge. The device includes one or more motors having one or more rotational shafts selectively fixable with one or more rotatable brushes. The one or more rotatable brushes have a plurality of bristles. At least a portion of bristles projects below a plane of the lower side of the enclosure. The device also includes a circuit adapted for connecting power from a power source to the one or more motors for a preset period of time upon actuation of an electrical switch connected thereto. The circuit is adapted to run the one or more motors in a first direction and then an opposing direction, such that if the device becomes stuck at an obstruction, it will eventually
(Continued)

turn around due to the alternating directions of the one or more motors.

20 Claims, 8 Drawing Sheets

Related U.S. Application Data is a continuation of application No. 13/671,125, filed on Nov. 7, 2012, now Pat. No. 9,161,612, and a continuation-in-part of application No. 29/552,690, filed on Jan. 25, 2016, which is a division of application No. 29/482,173, filed on Feb. 14, 2014, now Pat. No. Des. 753,355, which is a continuation-in-part of application No. 29/451,847, filed on Apr. 9, 2013, now abandoned, which is a continuation-in-part of application No. 14/884,675, filed on Oct. 15, 2015, now Pat. No. 9,408,458, which is a continuation of application No. 13/671,125, filed on Nov. 7, 2012, now Pat. No. 9,161,612.

(60) Provisional application No. 61/565,268, filed on Nov. 30, 2011, provisional application No. 61/565,268, filed on Nov. 30, 2011.

(51) Int. Cl.
| | |
|---|---|
| *A46B 9/02* | (2006.01) |
| *A46B 13/00* | (2006.01) |
| *B08B 1/00* | (2006.01) |
| *A47J 37/07* | (2006.01) |
| *A46B 13/02* | (2006.01) |
| *A46D 1/00* | (2006.01) |
| *B08B 1/04* | (2006.01) |
| *A47L 11/282* | (2006.01) |
| *A47L 11/40* | (2006.01) |

(52) U.S. Cl.
CPC .............. *A46B 9/026* (2013.01); *A46B 13/00* (2013.01); *A46B 13/001* (2013.01); *A46B 13/02* (2013.01); *A46B 13/026* (2013.01); *A46D 1/0207* (2013.01); *A47J 37/0786* (2013.01); *A47L 11/282* (2013.01); *A47L 11/4005* (2013.01); *A47L 11/4008* (2013.01); *A47L 11/4011* (2013.01); *A47L 11/4041* (2013.01); *A47L 11/4066* (2013.01); *A47L 11/4091* (2013.01); *B08B 1/04* (2013.01); *A46B 2200/3033* (2013.01); *A47L 2201/00* (2013.01)

(58) Field of Classification Search
CPC ... A46B 3/18; A46B 7/04; A47L 11/00; A47L 11/282; A47L 11/4002; A47L 11/4011
USPC .............................. 15/21.1, 52.1, 49.1, 319
See application file for complete search history.

(56) References Cited

U.S. PATENT DOCUMENTS

| | | | |
|---|---|---|---|
| 7,571,511 B2 | 8/2009 | Jones et al. | |
| 9,161,612 B2* | 10/2015 | Woods | A46B 13/02 |
| 9,408,458 B2* | 8/2016 | Woods | A46B 13/02 |
| 2003/0228834 A1 | 12/2003 | Furey | |
| 2004/0226577 A1* | 11/2004 | Schaaf | A47L 13/16 134/6 |
| 2008/0282494 A1 | 11/2008 | Won et al. | |
| 2008/0307590 A1* | 12/2008 | Jones | A47L 5/30 15/21.1 |
| 2013/0232703 A1 | 9/2013 | Jang et al. | |

FOREIGN PATENT DOCUMENTS

| | | |
|---|---|---|
| EP | 2785234 A2 | 8/1988 |
| EP | 1797809 A2 | 6/2007 |
| EP | 2422675 A2 | 2/2012 |
| KR | 1020100123585 | 11/2010 |
| WO | WO-2011044291 A2 | 4/2011 |

OTHER PUBLICATIONS

Examination Report issued in New Zealand Design Application No. 418076 (now abandoned), which lists the same inventor as the instant application, dated Sep. 26, 2013 and Examination Report dated Oct. 18, 2013 including You Tube search results; 8 pgs. cited by applicant.
Examination Report from Australian patent application No. 2012346168 (now issued as AU2012346168 on Nov. 2, 2016) which is a national phase of PCT application No. PCT/US2012/066678 (now published as WO2013/082046) which has the same priority claim as the instant application, dated Aug. 5, 2015; 3 pgs.
European Search Report dated Oct. 13, 2015 for European application No. 12852706.6 filed Nov. 27, 2012 (now issued as EP2785234B1 on Jun. 15, 2016) which claims priority to the same parent application as the instant application, 4 pages.

* cited by examiner

SURFACE-CLEANING DEVICE

CROSS-REFERENCE TO RELATED APPLICATIONS

This application is a continuation-in-part of U.S. Utility patent application Ser. No. 14/884,675 filed Oct. 15, 2015 (published as US 2016/0029779 on Feb. 4, 2016, to issue as U.S. Pat. No. 9,408,458 on Aug. 9, 2016), which is a continuation of U.S. Utility patent application Ser. No. 13/671,125 filed Nov. 7, 2012 (published as US 2013/0061408 on Mar. 14, 2013 and issued as U.S. Pat. No. 9,161,612 on Oct. 20, 2015), which, in turn, claimed the benefit and priority of U.S. Provisional Patent Application No. 61/565,268 filed Nov. 30, 2011.

This application is a continuation-in-part of U.S. Design Patent Application No. 29/552,690 filed Jan. 25, 2016, which, in turn, is:
- a divisional of U.S. Design Patent Application 29/482,173 filed Feb. 14, 2014 (now U.S. Design Patent D753,355 issued Apr. 5, 2016), which, in turn was a continuation-in-part of now-abandoned U.S. Design Patent Application 29/451,847 filed Apr. 9, 2013; and
- a continuation-in-part of U.S. Utility patent application Ser. No. 14/884,675 filed Oct. 15, 2015 (published as US 2016/0029779 on Feb. 4, 2016, to issue as U.S. Pat. No. 9,408,458 on Aug. 9, 2016), which is a continuation of U.S. Utility patent application Ser. No. 13/671,125 filed Nov. 7, 2012 (published as US 2013/0061408 on Mar. 14, 2013 and issued as U.S. Pat. No. 9,161,612 on Oct. 20, 2015), which, in turn, claimed the benefit and priority of U.S. Provisional Patent Application No. 61/565,268 filed Nov. 30, 2011.

The entire disclosures of each of the above applications are incorporated herein by reference.

FIELD OF THE INVENTION

This invention relates to cleaning machines, and more particularly to a surface cleaning machine particularly well-suited for cleaning barbeque grills.

DISCUSSION OF RELATED ART

Automated cleaning machines have become popular for cleaning surfaces such as carpeted and hard wood floors. However, none of the prior art devices is well suited for automatically cleaning a barbeque grill, which can be an arduous task particularly if the grill is allowed to cool. Perhaps the best time to clean a grill is immediately after cooking when food and gristle is still warm and easier to remove. Yet that is also the best time to eat the food that has just been cooked. Such prior art floor cleaning machines further do not provide for one or more cleaning elements to simultaneously serve as the cleaning and motive force for the device.

Therefore, there is a need for a device that automatically cleans a barbeque grill or other surface for a preset period of time, and that can withstand the heat generated by a barbeque that has just been used. Such a needed device would be easy to use, relatively inexpensive to manufacture, and would allow for easily replacing detachable cleaning brushes and contact pads as necessary. Such a needed invention would be easy to store when not in use, and would provide a means for not becoming stuck when encountering the edge of the grill or other obstruction. The present invention accomplishes these objectives.

SUMMARY OF THE INVENTION

A device for cleaning a surface (e.g., a barbeque grill, etc.) generally includes an enclosure having at least a lower side, an upper side, and a peripheral edge. The device includes one or more motors having one or more rotational shafts selectively fixable with one or more rotatable brushes. The one or more rotatable brushes have a plurality of bristles. At least a portion of bristles of each brush projects below a plane of the lower side of the enclosure. The device also includes a circuit adapted for connecting power from a power source to the one or more motors for a preset period of time upon actuation of an electrical switch connected thereto. The circuit is adapted to run the one or more motors in a first direction and then an opposing direction, such that if the device becomes stuck at an obstruction, it will eventually turns around due to the alternating directions of the one or more motors. The lower side of the enclosure may further include a recess for each of the one or more brushes.

Preferably, the rotational axis of each brush and the rotational shaft of each motor are substantially parallel to the plane of the lower side of the enclosure. Further, preferably the plurality of motors with brushes is an odd number, such as three each at relative angles of 60 degrees, whereby each brush is capable of moving the enclosure in a direction different from any of the other brushes.

The enclosure further contains a power source, such as a plurality of batteries. The enclosure further contains a circuit adapted for connecting power from the power source to each of the motors for a preset period of time upon actuation of an electrical switch connected thereto that is accessible from outside of the enclosure. The circuit is adapted to run each motor in a first direction and then an opposing direction, such as by switching the polarity of the power applied to each motor, preferably every one to two seconds, for example.

Preferably the circuit further includes an indicator, such as one or more LED lamps, for indicating one of a plurality of program times. As such, with multiple actuations of the switch, each program time is advanced in sequence, the indicator indicating the currently-selected program time and the circuit running the motors back and forth for the currently-selected program time.

In use, with the enclosure placed upon the surface and with the switch actuated, the circuit runs each motor in the first direction and then alternately in the opposing direction, such that the brushes simultaneously support and move the device along the surface and clean the surface. The enclosure, if becoming stuck at an obstruction, eventually turns around due to the alternating directions of the motors. In one exemplary embodiment, pressing the switch to select a program time results in the indicator indicating the selected program time for five seconds, after which time the control circuit actuates the motors for the programmed time, alternating the direction of each motor independently of the other motors. At any time, holding down the switch for more than three seconds, for example, directs the circuit to go into a sleep mode wherein the indicator and the motors are deactivated until the next press of the switch. A rack may be included for providing convenient storage for the device when not in use.

The present invention is a device that automatically cleans a barbeque grill or other surface for a preset period of time, and that can withstand the heat generated by a barbeque that has just been used. The present device is easy to use, relatively inexpensive to manufacture, and allows for easily replacing detachable cleaning brushes and contact pads as necessary. The present invention is easy to store when not in use, and provides a means for not becoming stuck when encountering the edge of the grill or other obstruction during use. Other features and advantages of the present invention will become apparent from the following more detailed description, taken in conjunction with the accompanying drawings, which illustrate, by way of example, the principles of the invention.

DETAILED DESCRIPTION

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

Figure 1:
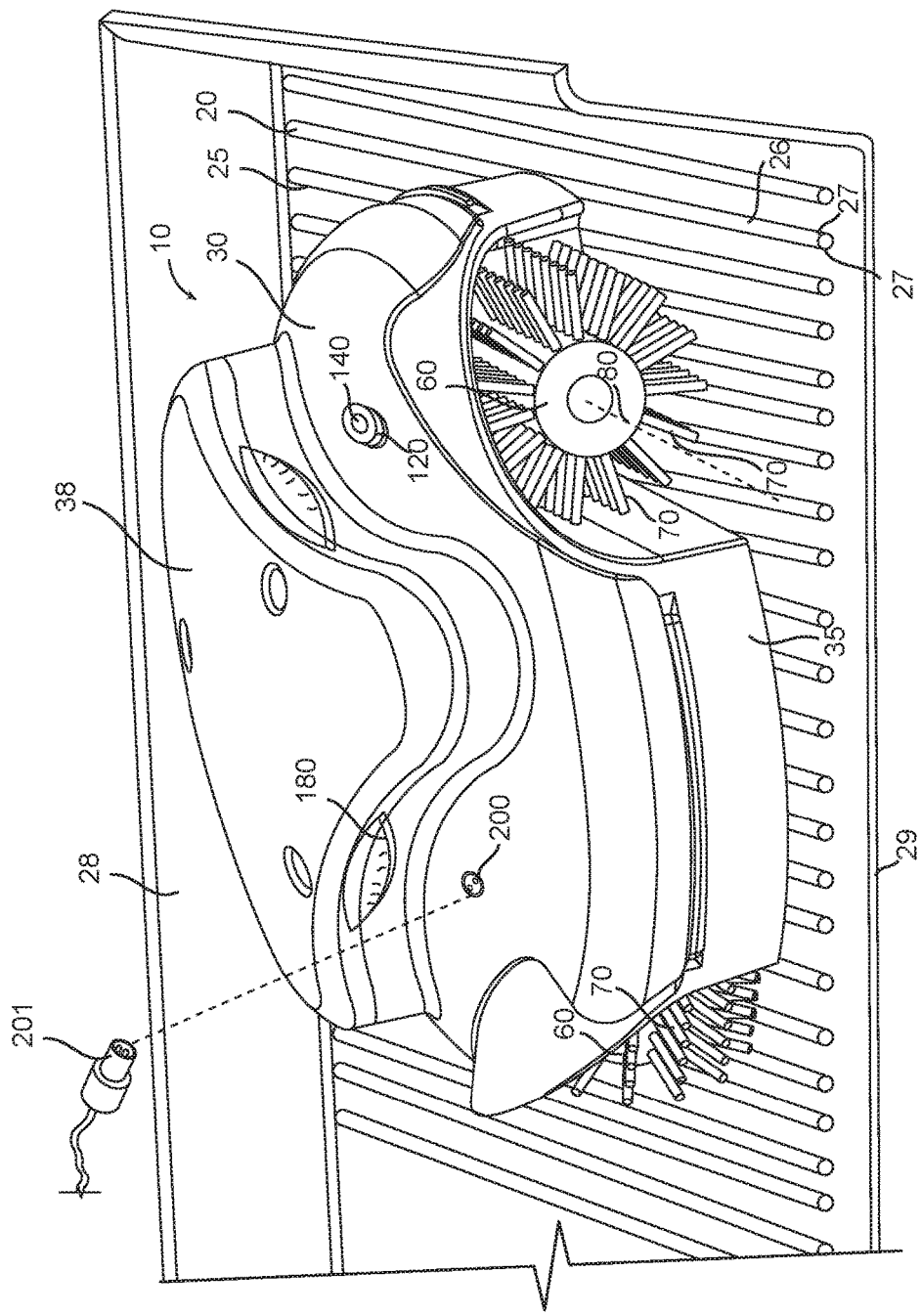
FIG. 1 is a perspective view of the invention.
Figure 2:
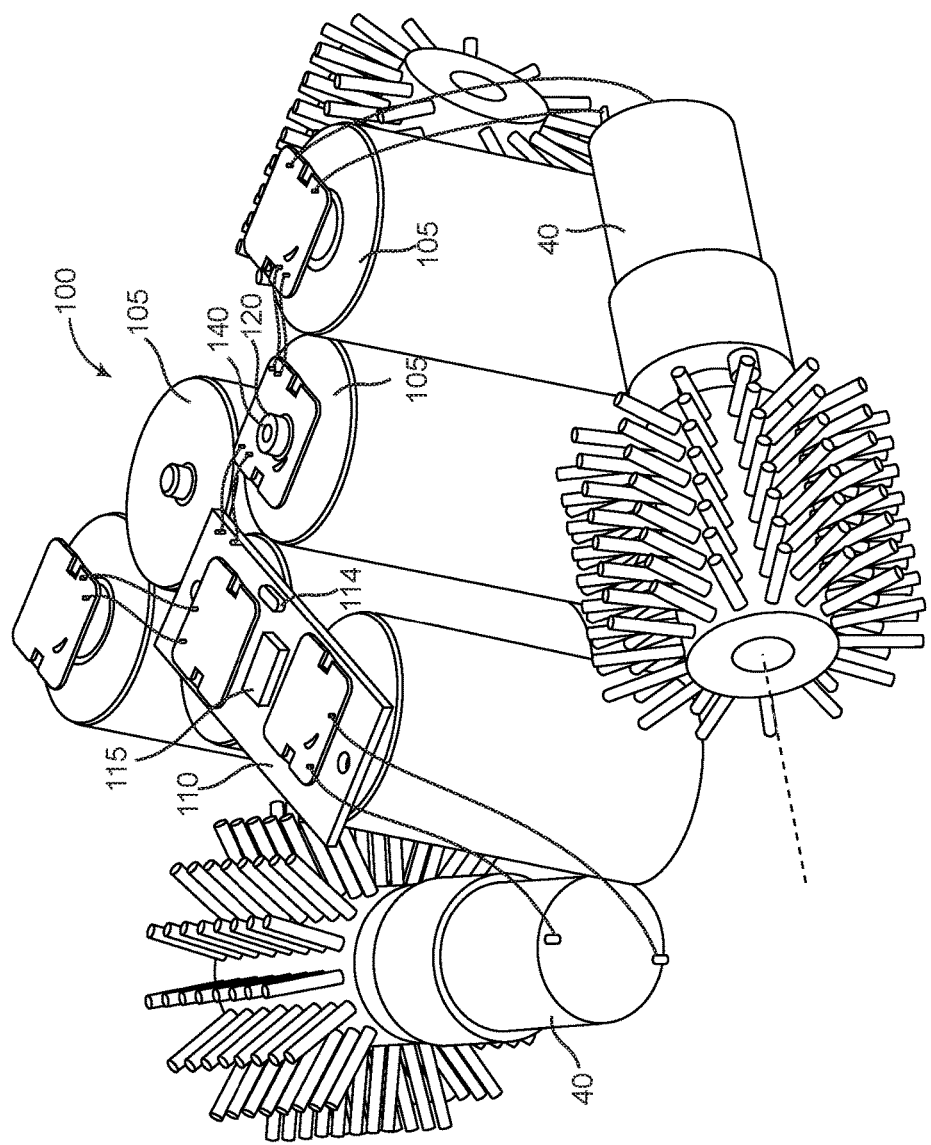
FIG. 2 is a perspective view of the invention, illustrated with an enclosure omitted for clarity of illustration.

FIGS. 1 and 2 illustrate a device 10 for cleaning a surface 20, such as the top surface 26 and side surfaces 27 of a plurality of barbeque grill rods 25. Other surfaces 20 may include all types of hard floors, for example, such as wood, tile, laminate, concrete, or the like.

Figure 10:
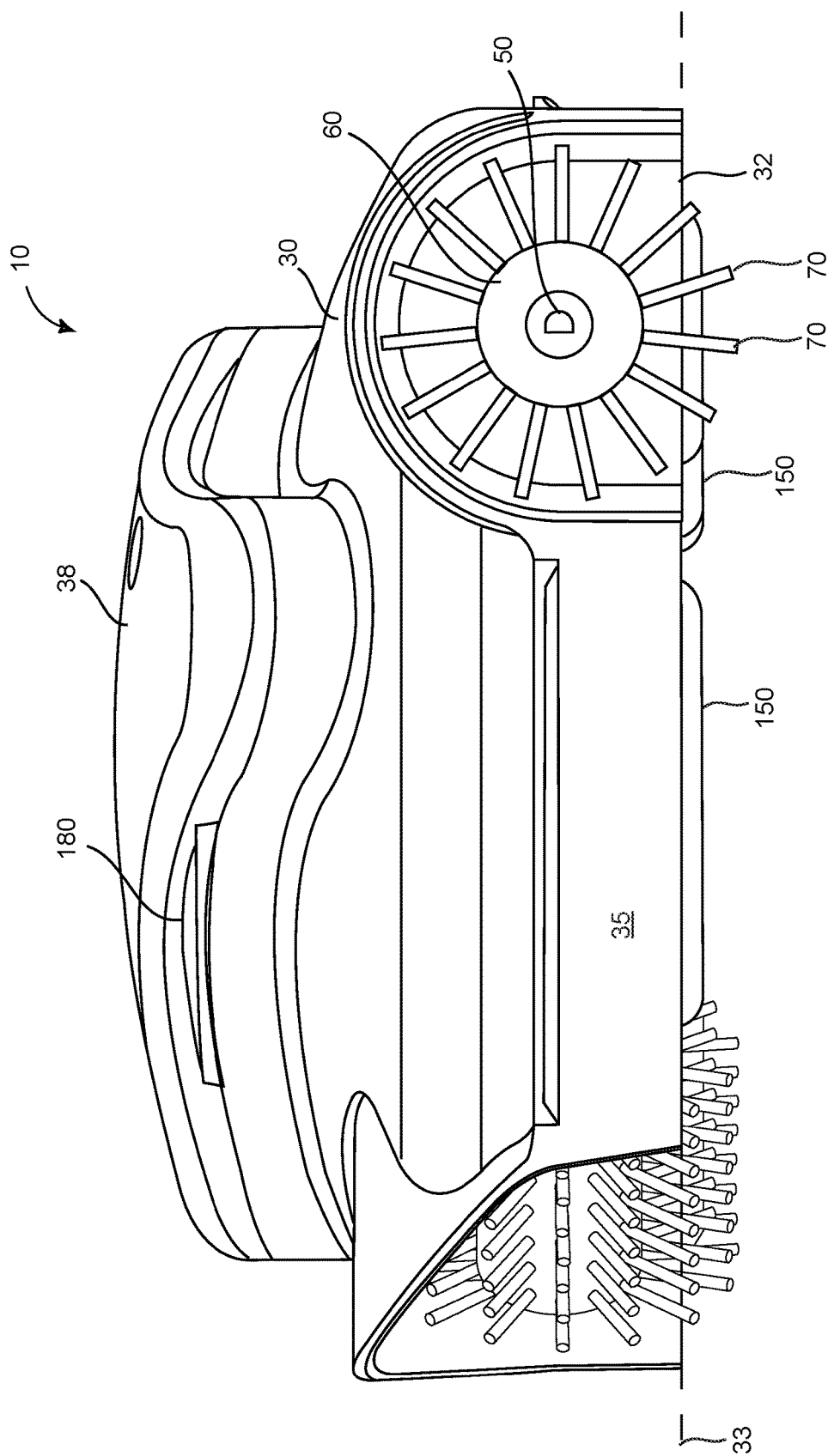
FIG. 10 is a side elevational view of the invention.

A substantially hollow enclosure 30 has at least a lower side 32, an upper side 38, and a peripheral edge 35. The enclosure 30 is preferably made from a high heat-resistant plastic material, such as a high-temperature polyurethane (for example, TC-895 A/B Black produced by BJB Enterprises, Inc., of Tustin, Calif.). An insulator 130 (FIG. 3) may additionally be included proximate the lower side 32 of the enclosure 30 to insulate the interior of the enclosure 30 from heat emanating from the surface 20. The peripheral edge 35 may be rigid and reinforced with ribs (not shown) or other reinforcement structures to absorb kinetic energy of the device 10 upon contacting an obstruction 28 (FIG. 1). Further, the enclosure may include at least one handle 180 (FIGS. 1 and 10) for allowing convenient and clean lifting of the device 10 from the surface 20.

Figure 3:
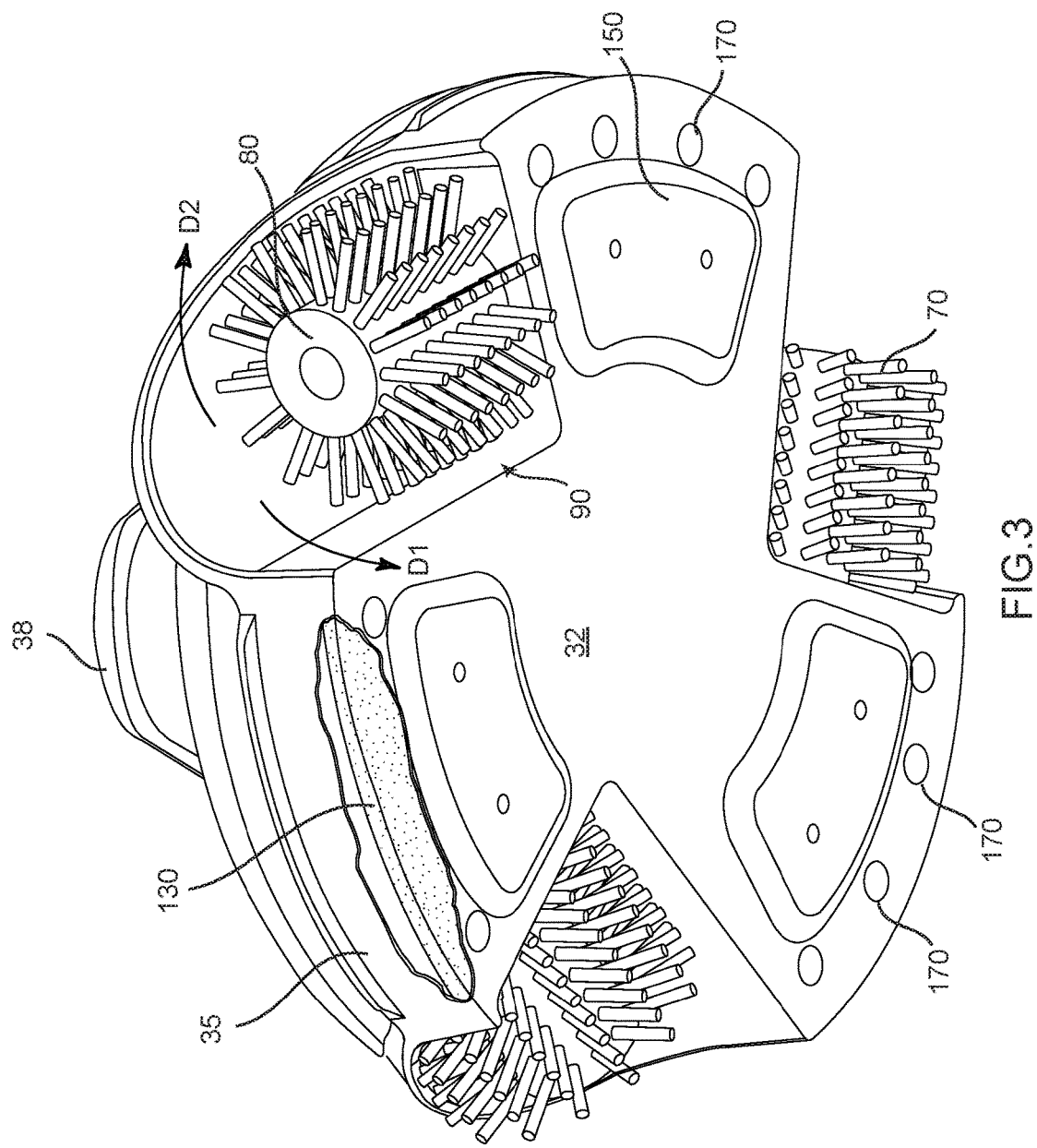
FIG. 3 is a bottom perspective view of the invention, partially cut-away.
Figure 4:
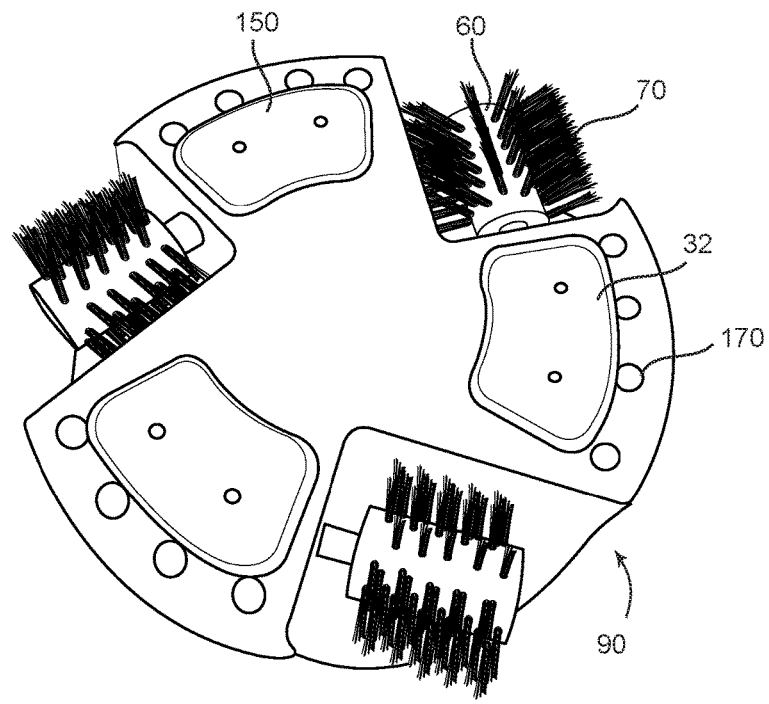
FIG. 4 is a bottom plan view of the invention, illustrated with two of three contact pads omitted for clarity of illustration.

The enclosure 30 contains a plurality of motors 40 each having a rotational shaft 50 selectively fixable with a rotatable brush 60. Each brush 60 has a plurality of bristles radially projecting from a rotational axis 80 thereof, and at least a portion of the bristles 70 of each brush 60 project below a plane 33 (FIG. 10) of the lower side of the enclosure 30. The lower side 32 of the enclosure 30 may further include a recess 90 for each brush 60 (FIGS. 3 and 4). Preferably the bristles 70 of each brush are made of brass, whereby the bristles 70 are suitable for use on a barbeque grill surface 20. Alternately, the brushes may be made of some other material, such as a softer material, for use on a softer surface 20 without scratching thereof, for example.

Figure 7:
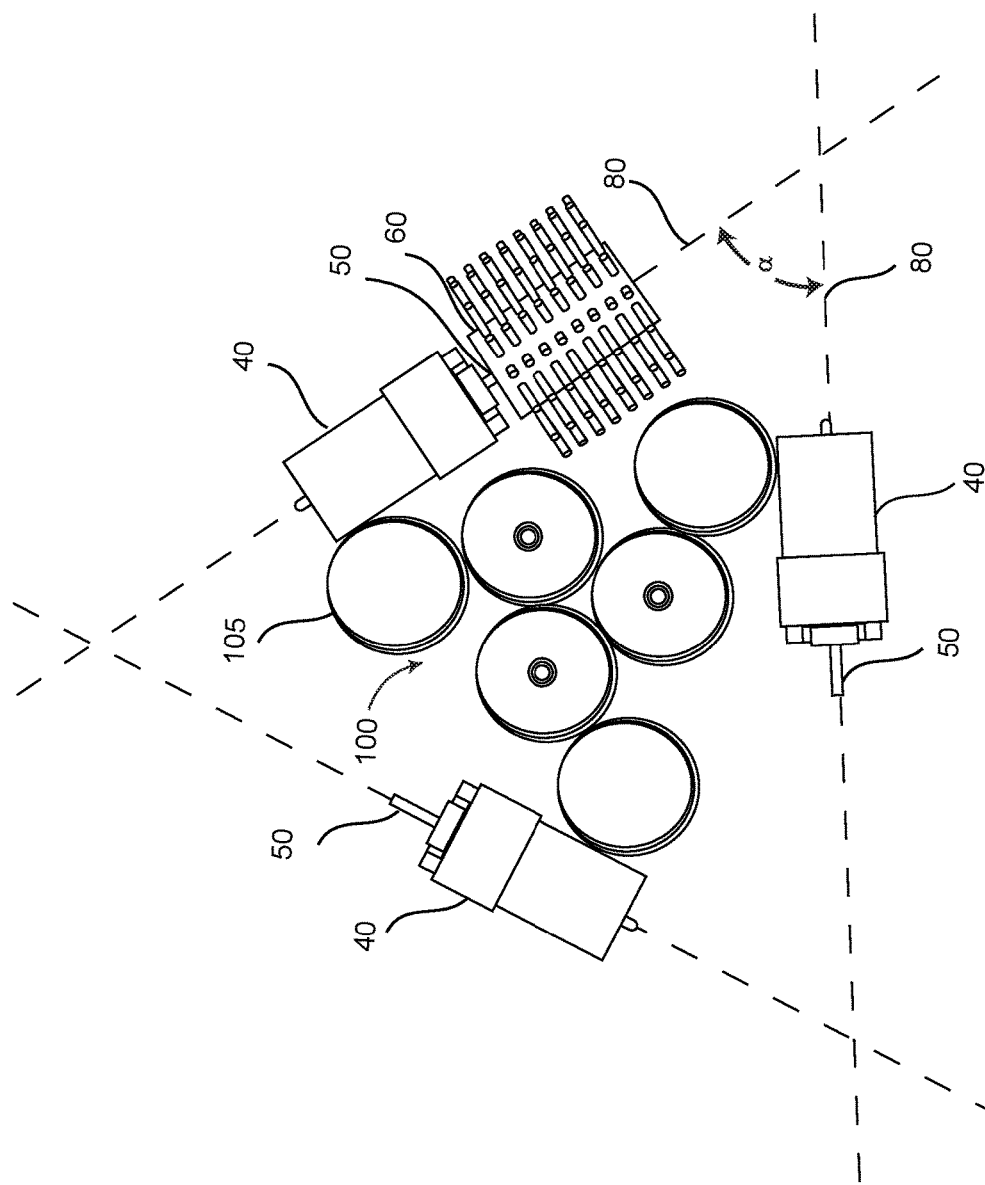
FIG. 7 is a top plan view of FIG. 2.

Preferably the rotational axis 80 of each brush 60 and the rotational shaft 50 of each motor 40 are substantially parallel to the plane of the lower side 32 of the enclosure 30. Further, preferably the plurality of motors 40 with brushes 60 is an odd number, such as three each at relative angles a of preferably 60 degrees (FIG. 7), whereby each brush 60 is capable of moving the enclosure 30 in a direction different from any of the other brushes 60.

The enclosure 30 further contains a power source 100, such as a plurality of either rechargeable or non-rechargeable batteries 105, such as D-cell type batteries for example. In an embodiment where each battery 105 is a rechargeable battery, a recharging port 200 (FIG. 1) may be included that is electrically connected with each battery 105 such that an external power source 201 may be selectively fixed with the recharging port 200 to recharge each battery 105. Alternately, the power source 100 may be a power cord (not shown) that may be plugged into a power outlet, for example, for powering the motors 40 directly.

The enclosure 30 further contains a circuit 110 adapted for connecting power from the power source 100 to each of the motors 40 for a preset period of time $T_n$ upon actuation of an electrical switch 120 connected thereto. The circuit 110 is adapted to run each motor 40 in a first direction $D_1$ and then an opposing direction $D_2$ (FIG. 3), such as by switching the polarity of the power applied to each motor 40, preferably every one to two seconds, for example.

Preferably the circuit 110 further includes an indicator 140, such as one or more LED lamps, or the like, for indicating one of a plurality of program times $P_n$. As such, with multiple actuations of the switch 120, each program time Pi, $P_2$, ... $P_n$ is advanced in sequence, the indicator 140 indicating-such as by flashing a corresponding number of times or illuminating in a particular color such as red, green, or yellow—the currently-selected program time $P_n$ and the circuit 110 running the motors 140 back and forth for the currently-selected program time $P_n$. In such an embodiment the circuit 110 further includes a timer function 114. For example, in an embodiment having three program times $P_n$, $P_1$ may be five minutes, $P_2$ seven minutes, and $P_3$ ten minutes.

In use, with the enclosure 30 placed upon the surface 20 and with the switch 120 actuated, the circuit 110 runs each motor 40 in the first direction $D_1$ and then alternately in the opposing direction $D_2$, such that the brushes 60 simultaneously support and move the device 10 along the surface 20 and clean the surface 20. The enclosure 30, if becoming stuck at an obstruction 28, eventually turns around due to the alternating directions $D_1$, D2 of the motors 40. In one exemplary embodiment, pressing the switch 120 to select a program time $P_n$ results in the indicator 140 indicating the selected program time $P_n$ for five seconds, after which time the control circuit 110 actuates the motors 40 as specified above for the programmed time $P_n$. At any time, holding down the switch 120 for more than three seconds, for example, directs the circuit 110 to go into a sleep mode wherein the indicator 140 and the motors 40 are deactivated until the next press of the switch 120.

In one embodiment the circuit 110 is adapted to change the direction of any of the plurality of motors 40 independently of the directions of the other motors 40.

Moreover, the circuit 110 may further include a random number generator 115, such that the direction of any of the plurality of motors 40 may be toggled in a substantially random manner, or in what appears to be a random manner but is rather a predetermined repeating program that simulates a random program. As such, the enclosure 30, if becoming stuck at an obstruction 28, eventually turns around due to the seemingly random directions $D_1$, $D_2$ of the motors 40 and resulting seemingly random path of the enclosure 30 on the surface 20.

Figure 8:
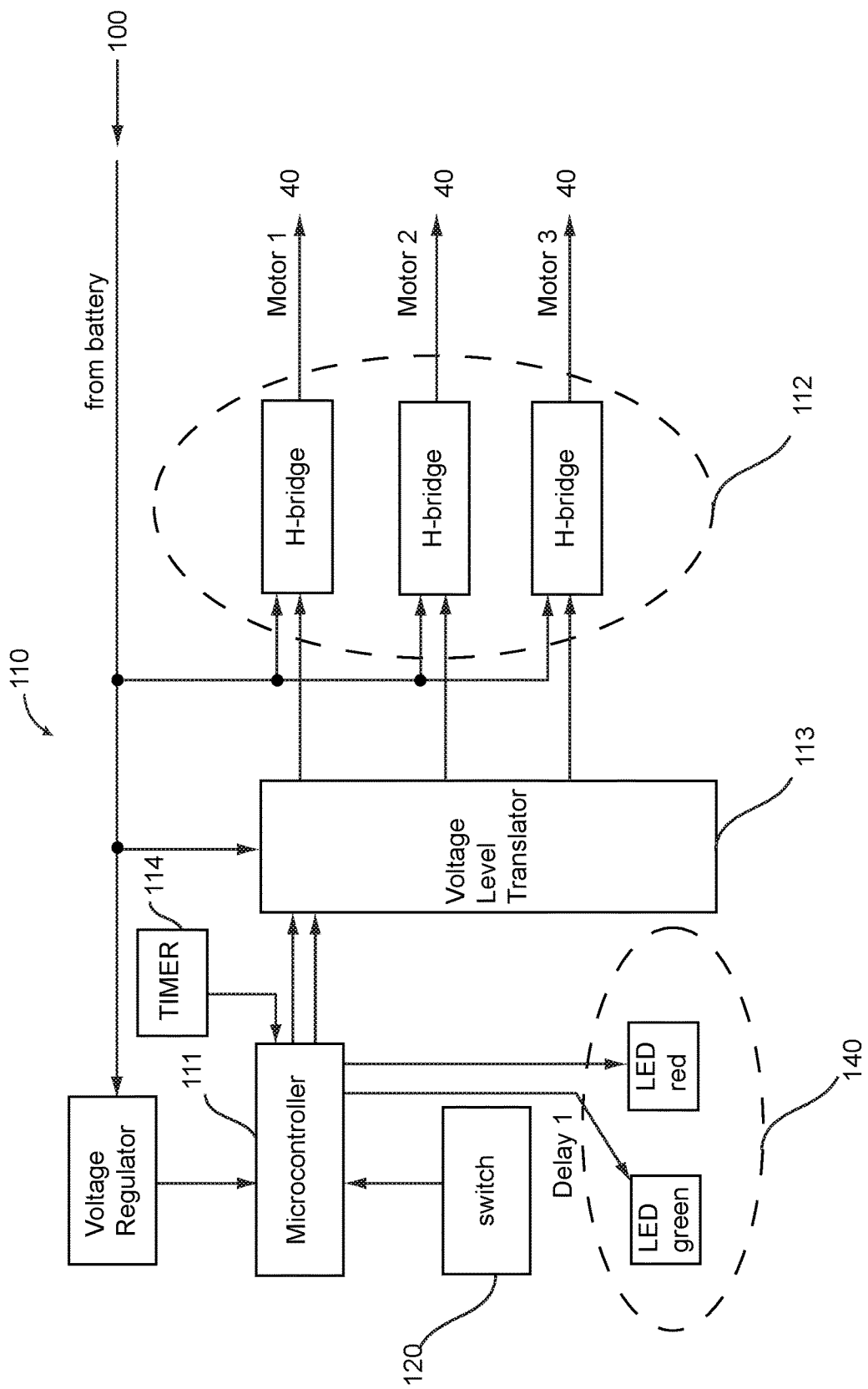
FIG. 8 is a diagram of a circuit of the invention.
Figure 9:
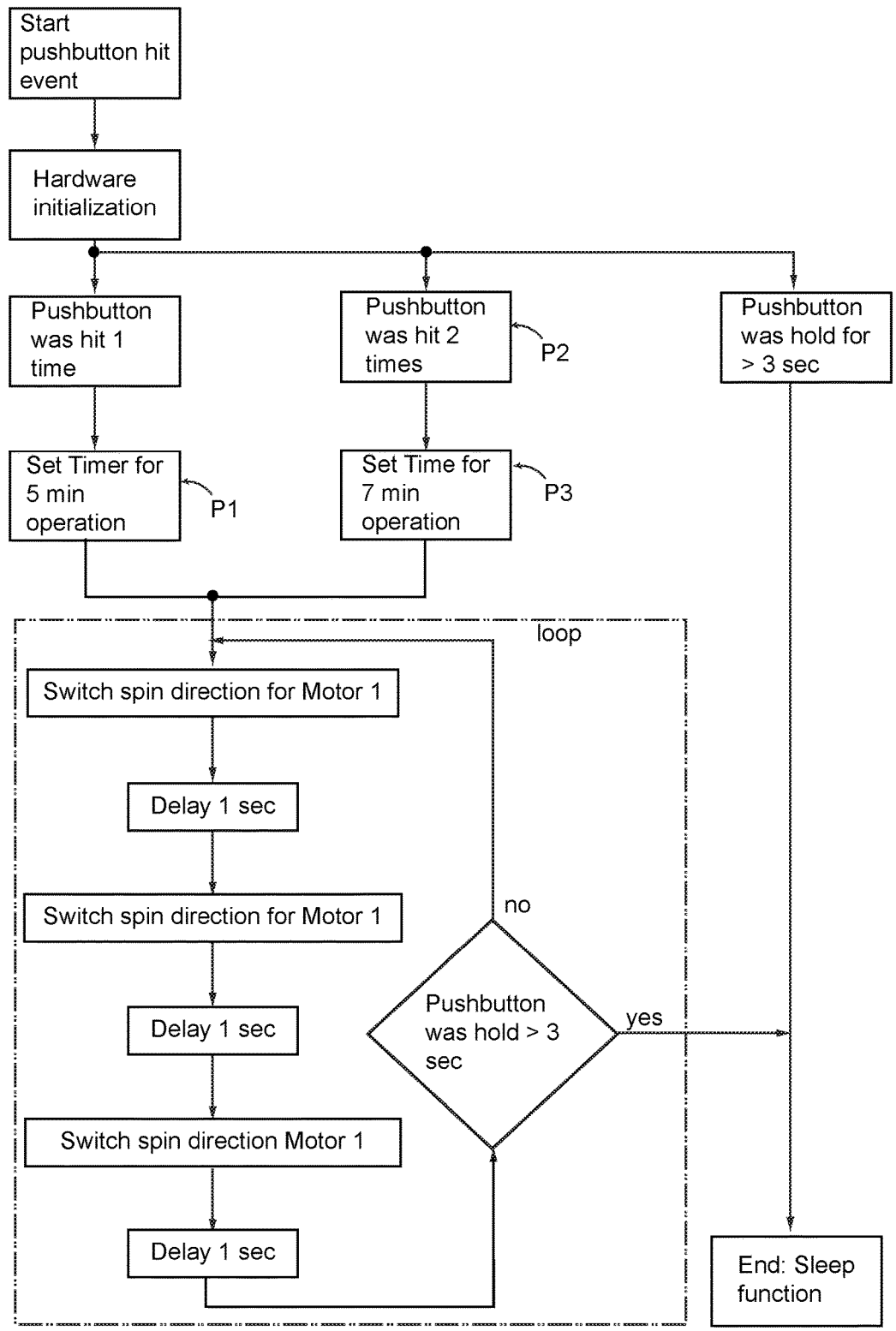
FIG. 9 is a functional block diagram of the steps of a microcontroller of the circuit.

The circuit 110 may further include a microcontroller 111 (FIG. 8) to control an H-bridge arrangement 112, solid state relays, or mechanical relays (all not shown) that provide power to the motors 40. The microcontroller 111 may further be used to detect activation of the switch 120, and to illuminate the indicator 140. The circuit 110 may further include a voltage translator or transformer 113, and optionally a voltage regulator 116, for providing differing voltages to the control circuit 110 and to the motors 40, as necessary.

In one embodiment, the lower surface 32 of the enclosure 30 includes at least one selectively detachable contact pad 150 (FIGS. 3 and 4), which supports the enclosure 30 on the surface 20 in cooperation with the brushes 60. The at least one contact pad 150 serves to temper the amount of contact each brush 60 has with the surface 30 to regulate the speed that the brushes 60 move the device 10 along the surface 20. As each contact pad 150 wears or becomes fouled, it may be replaced with a new contact pad 150 by removing mechanical fasteners (not shown), or the like, that hold each contact pad 150 to the lower surface 32 of the enclosure 30.

Figure 5:
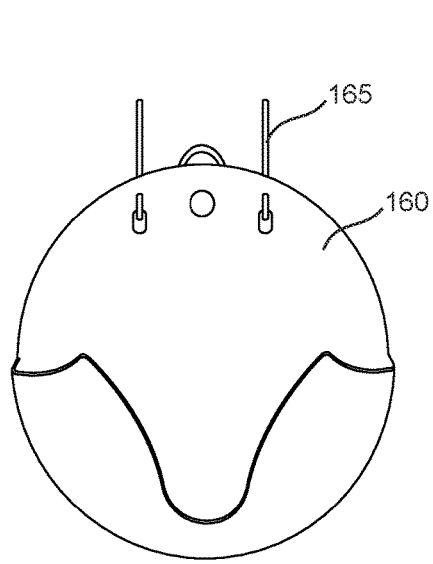
FIG. 5 is a front elevational view of a rack for storing the enclosure.
Figure 6:
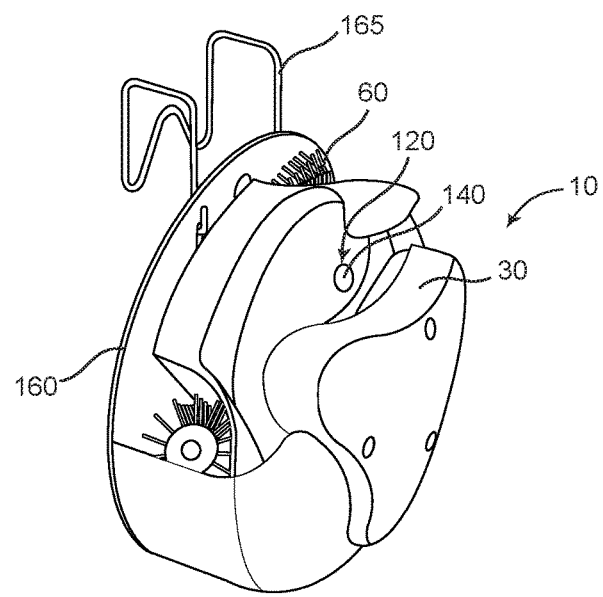
FIG. 6 is a perspective view of the rack, illustrated as supporting the enclosure.

FIGS. 5 and 6 illustrate a rack 160 that may be included for storing the device 10 when not in use. Such a rack 160 may include a hook arrangement 165 for suspending the rack 160 and the device 10 from an object (not shown), such as a fence or the like.

In one embodiment, the lower side 32 of the enclosure 30 further includes a plurality of sensors 170 (FIG. 3) for detecting an edge 29 of the surface 20. The circuit 110 is electrically connected with each sensor 170 and adapted to run at least one of the plurality of motors 40 in an opposing direction upon detection of the edge 29 of the surface 20. For example, each sensor 170 may be a capacitive or inductive sensor that detects the edge of the metallic barbeque grill 25. The circuit 110 may induce a charge or other signal into the barbeque grill 25 through the brass brushes 60, facilitating detection of the edge 29 of the grill 25. As such, the circuit 110 may be electrically connected with one or more of the brushes 60. Other sensors 170 may be utilized as well, such as optical or ultrasonic sensors, or the like, as are suitable for detecting such an edge 29.

While a particular form of the invention has been illustrated and described, it will be apparent that various modifications can be made without departing from the spirit and scope of the invention. For example, three motors and brushes are shown in the drawings, but any other suitable number of motors and brushes could be used, as could any suitable orientation thereof. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference.

Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A device for cleaning a surface of a grill, comprising:
an enclosure having at least a lower side, an upper side, and a peripheral edge;
one or more motors contained within the enclosure and having one or more rotational shafts fixed with one or more rotatable brushes, the one or more rotatable brushes having a plurality of bristles, at least a portion of the bristles projecting below a plane of the lower side of the enclosure, the bristles being made of material capable of withstanding heat emanating from the surface of the grill for cleaning the surface of the grill after the grill has just been used, wherein the one or more rotatable brushes simultaneously serve as the cleaning and motive force for the device when the one or more rotatable brushes are rotated by the one or more motors; and a circuit adapted for connecting power from a power source to the one or more motors for a preset period of time upon actuation of an electrical switch connected thereto, the circuit adapted to run the one or more motors in a first direction and then an opposing direction;

whereby with the enclosure placed upon the surface of the grill and the switch actuated, the circuit runs the one or more motors in the first direction and then alternatively in the opposing direction, such that the one or more rotatable brushes simultaneously support and move the device along the surface of the grill and clean the surface of the grill, the enclosure if becoming stuck at an obstruction eventually turning around due to the alternating directions of the one or more motors.

2. The device of claim 1, wherein the plurality of bristles include metal for cleaning the surface of the grill.

3. The device of claim 1, wherein the rotational axis of each of the one or more rotatable brushes is substantially parallel to the lower side of the enclosure, and wherein the rotational shaft of each of the one or more motors is substantially parallel to the lower side of the enclosure.

4. The device of claim 1, wherein each of the one or more rotatable brushes is selectively attachable to the rotational shaft of any of the one or more motors.

5. The device of claim 1, wherein the one or more rotatable brushes comprise a plurality of rotatable brushes, and wherein each of the plurality of rotatable brushes is oriented at a substantially same angle greater than zero degrees from each adjacent rotatable brush such that each rotatable brush is configured to move in a direction different from any other rotatable brush.

6. The device of claim 1, wherein the enclosure is made from a heat-resistant plastic material.

7. The device of claim 1, wherein the circuit further includes an indicator for indicating one of a plurality of program times, whereby multiple actuations of the switch advance the preset period of time from one program time to the next, the indicator indicating a currently-selected program time and the circuit running the one or more motors back and forth for the currently-selected program time.

8. The device of claim 1, wherein the one or more motors consists of a single motor.

9. The device of claim 8, wherein the one or more rotatable brushes comprise a plurality of rotatable brushes, and wherein the one or more motors consists of a single motor operable for rotating the plurality of rotatable brushes such that the plurality of rotatable brushes simultaneously serve as the cleaning and motive force for the device when the plurality of rotatable brushes are rotated by the single motor.

10. The device of claim 1, wherein the one or more motors comprises a plurality of motors, and wherein the circuit is adapted to change the direction of any of the plurality of motors independently of the direction of the other motors.

11. The device of claim 10, wherein the circuit further includes a random number generator, whereby the direction of any of the plurality of motors may be changed in a substantially random manner.

12. The device of claim 1, wherein the one or more motors and the one or more rotatable brushes are an odd number, and wherein each of the one or more rotatable brushes is capable of moving the enclosure in a direction different from any of the other rotatable brushes.

13. The device of claim 1, wherein the plurality of motors and the plurality of rotatable brushes is exactly three, and wherein each of the three rotatable brushes is oriented at a relative angle of substantially 60 degrees from each of the other rotatable brushes, such that each rotatable brush when rotated by its respective motor is capable of moving the device in a direction different from the other rotatable brushes.

14. The device of claim 1, wherein the one or more rotatable brushes provide the entire motive force for the device when the one or more rotatable brushes are rotated by the one or more motors as the device does not include wheels.

15. The device of claim 1, wherein the plurality of bristles includes brass, wherein the surface of the grill includes a plurality of spaced apart barbeque grill rods, each barbeque grill rod having a top surface and side surfaces, and wherein the bristles are adapted to clean the top surface of said each barbeque grill rod and at least a portion of the side surfaces of each said barbeque grill rod.

16. The device of claim 1, wherein:
the plurality of bristles includes metal for cleaning the surface of the grill; and/or
the one or more rotatable brushes provide the entire motive force for the device when the one or more rotatable brushes are rotated by the one or more motors; and/or
the enclosure is made from a heat-resistant plastic material comprising high-temperature polyurethane; and/or
the power source includes at least one rechargeable battery, and wherein a charging port is electrically connected with the at least one rechargeable battery and fixed through the enclosure, whereby an external power source may be used to charge the at least one rechargeable battery.

17. A device for cleaning a surface of a grill, comprising:
an enclosure having at least a lower side, an upper side, and a peripheral edge;
one or more motors contained within the enclosure and having one or more rotational shafts fixed with one or more rotatable brushes, the one or more rotatable brushes having a plurality of bristles, at least a portion of the bristles projecting below a plane of the lower side of the enclosure, the bristles capable of withstanding heat emanating from the surface of the grill for cleaning the surface of the grill after the grill has just been used, wherein the one or more rotatable brushes provide the only motive force for the device when the one or more rotatable brushes are rotated by the one or more motors; and
a circuit adapted for connecting power from a power source to the one or more motors for a preset period of time upon actuation of an electrical switch connected thereto, the circuit adapted to run the one or more motors in a first direction and then an opposing direction, the circuit including an indicator for indicating one of a plurality of program times;

wherein multiple actuations of the switch advance the preset period of time from one program time to the next, the indicator indicating a currently-selected program time and the circuit running the one or more motors back and forth for the currently-selected program time;

whereby with the enclosure placed upon the surface and the switch actuated, the circuit runs the one or more motors in the first direction and then alternately in the opposing direction, such that the one or more rotatable brushes simultaneously support and move the device along the surface and clean the surface, the enclosure if becoming stuck at an obstruction eventually turning around due to the alternating directions of the one or more motors.

18. The device of claim 17, wherein:

the plurality of bristles include metal for cleaning the surface of the grill; and the one or more rotatable brushes simultaneously serve as the cleaning and motive force for the device when the one or more rotatable brushes are rotated by the one or more motors.

19. A device for automatically cleaning a surface of a barbeque grill including a plurality of barbeque grill rods having top and side surfaces, the device comprising:

an enclosure made from a heat-resistant material capable of withstanding heat of a barbeque grill that has just been used;

one or more motors within the enclosure and having one or more rotational shafts fixed with one or more rotatable brushes, the one or more rotatable brushes having a plurality of bristles, the bristles being made of material capable of withstanding heat emanating from the surface of the grill for cleaning the surface of the grill after the grill has just been used, wherein the one or more rotatable brushes provide the sole motive force for the device when the one or more rotatable brushes are rotated by the one or more motors, wherein at least a portion of the bristles project sufficiently below the lower side of the enclosure to extend below the top surfaces of the barbeque grill rods and into the spaces separating adjacent pairs of the barbeque grill rods to thereby be suitable for cleaning the top surfaces and at least a portion of the side surfaces of the barbeque grill rods; and a circuit adapted for connecting power from a power source to the one or more motors for a preset period of time upon actuation of an electrical switch connected thereto, the circuit adapted to run the one or more motors in a first direction and then an opposing direction, and to change the direction of any of the one or more motors independently of the direction of the other one or more motors in a substantially random manner;

whereby with the enclosure placed upon the surface of the barbeque grill and the switch actuated, the circuit runs the one or more motors in the first direction and then alternately in the opposing direction, such that the one or more rotatable brushes simultaneously support and move the device along the surface of the barbeque grill and clean the surface of the barbeque grill, the enclosure if becoming stuck at an obstruction eventually turning around due to the alternating directions of the one or more motors.

20. The device of claim 19, wherein:

the plurality of bristles include metal for cleaning the surface of the grill; and the one or more rotatable brushes simultaneously serve as the cleaning and motive force for the device when the one or more rotatable brushes are rotated by the one or more motors.

* * * * *